United States Patent [19]

Healy

[11] Patent Number: 4,858,494
[45] Date of Patent: Aug. 22, 1989

[54] TORQUE RESPONSIVE AUTOMATIC SHIFTING HUB

[76] Inventor: Donald B. Healy, 618 San Roque Rd., Santa Barbara, Calif. 93105

[21] Appl. No.: 189,336
[22] Filed: May 2, 1988
[51] Int. Cl.[4] .................. F16H 3/44; F16H 57/10; F16D 23/00; F16D 11/06
[52] U.S. Cl. ................................. 74/781 B; 192/64; 192/81 C
[58] Field of Search .................. 74/781 B, 750 B; 192/41 S, 64, 81 C

[56] References Cited

U.S. PATENT DOCUMENTS

| 2,229,654 | 1/1941 | Hubbel | 192/41 S |
|---|---|---|---|
| 3,008,558 | 11/1961 | Bennet et al. | 192/81 C |
| 3,180,181 | 4/1965 | Schwerdhöfer | 74/750 B |
| 3,351,165 | 11/1967 | Shimano | 192/6 |
| 3,372,608 | 3/1968 | Gleasman | 74/750 B |
| 3,388,617 | 6/1968 | Nelson | 74/752 |
| 3,608,398 | 9/1971 | Segawa et al. | 74/752 |
| 3,874,253 | 4/1975 | Waddington | 74/804 |
| 3,934,493 | 1/1976 | Hillyer | 74/750 B |
| 3,937,309 | 2/1976 | Schulz et al. | 74/750 B |
| 3,995,503 | 12/1976 | Schulz | 74/750 B |
| 4,240,533 | 12/1980 | Fukui | 74/750 B |
| 4,461,375 | 7/1984 | Brown | 192/45 |
| 4,644,828 | 2/1987 | Kozakae | 74/750 B |

Primary Examiner—Leslie A. Braun
Assistant Examiner—Harold F. Macris
Attorney, Agent, or Firm—Harry W. Brelsford

[57] ABSTRACT

A torque responsive five-stage automatic shifting hub utilizes inner wrapped spring clutches to rotate a plurality of co-axial cylinders except for the cylinder at one end of the axis rotated by a sprocket. Gearing is interposed between the cylinders to rotate them at progressively different rpm. The wheel hub is rotated by outer wrapped springs, one over each cylinder, having one end secured to the hub and the other end floating. The outer wrapped springs automatically wrap on a cylinder rotating faster than the hub and automatically release a cylinder rotating slower than the hub. The inner wrapped spring clutches are actuated by compression springs between the cylinders which expand to actuate the associated clutch and compress to deactivate the clutch. The compression springs are of progressively different strengths along the axis of the cylinders. When the applied torque equals the strength of a particular compression springs between two cylinders, the compression springs expand to activate the associated clutch and rotate the associated cylinder.

13 Claims, 3 Drawing Sheets

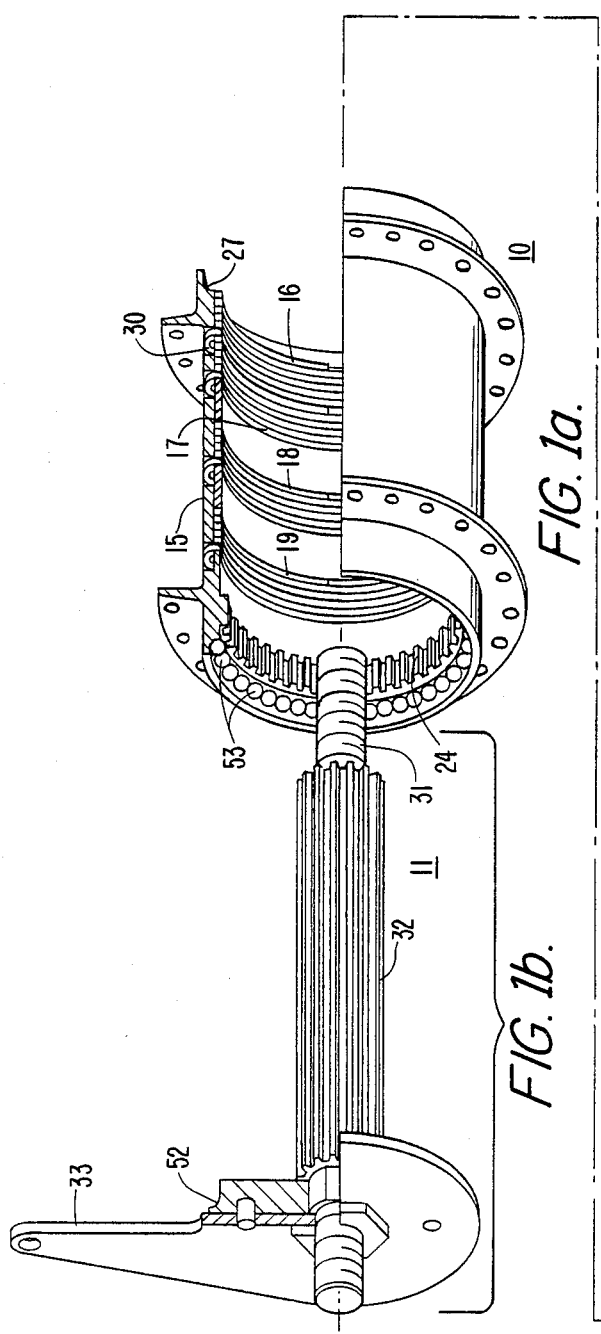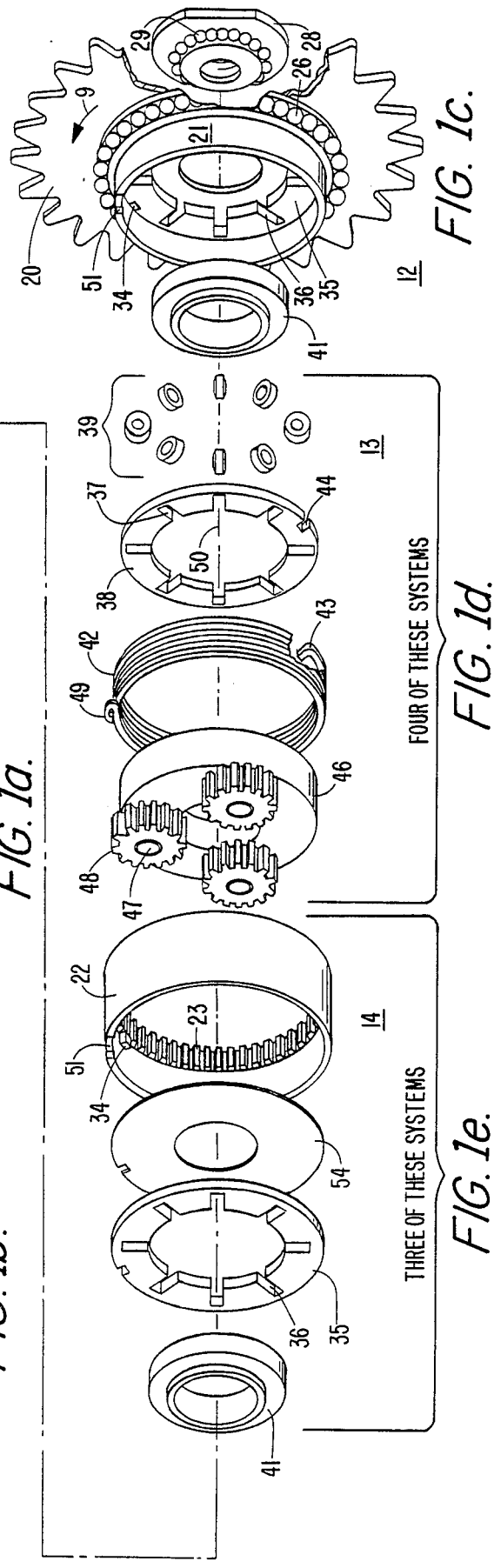

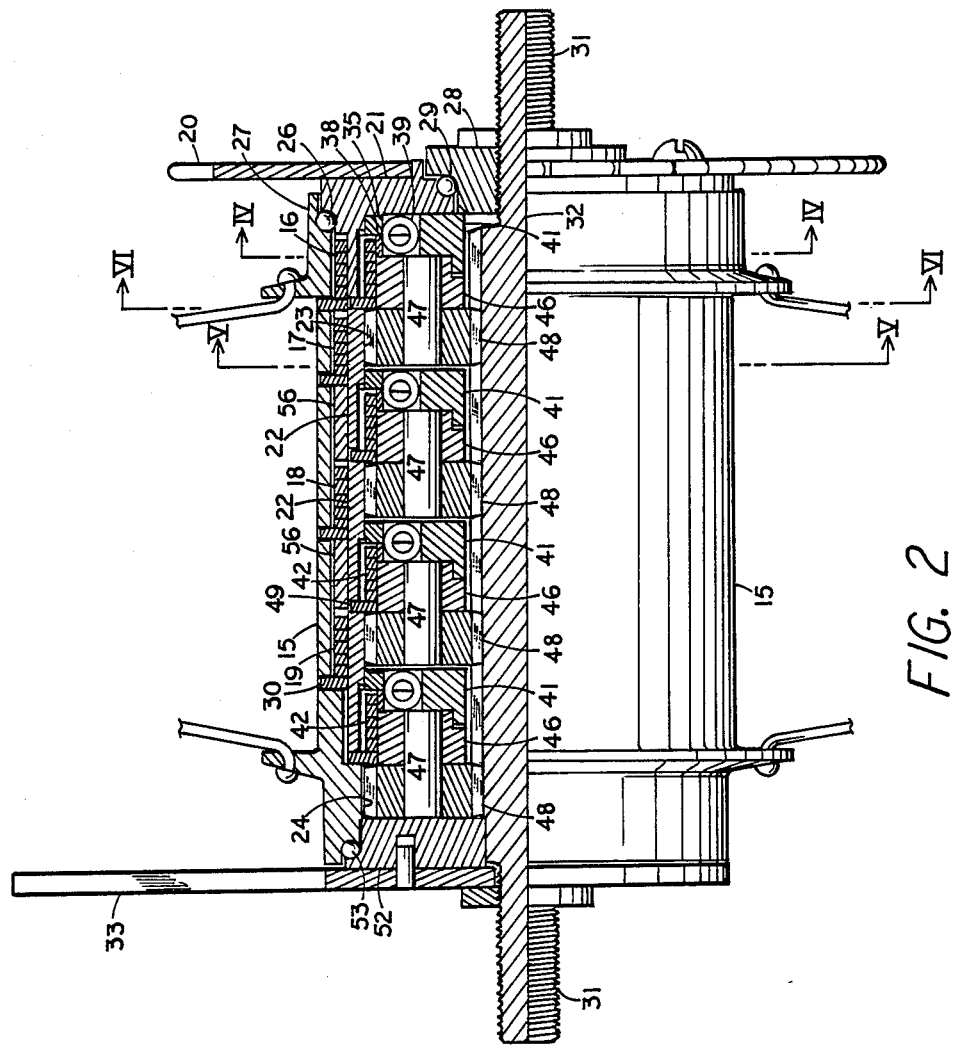
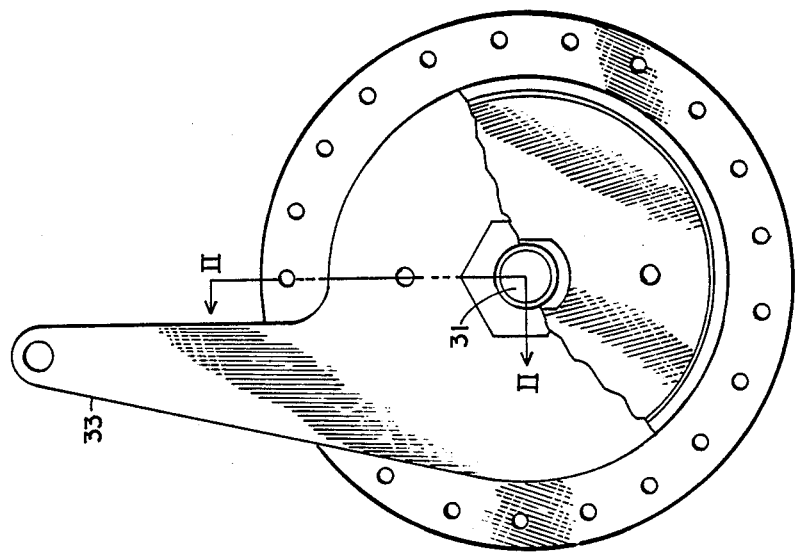
FIG. 2
FIG. 3

TORQUE RESPONSIVE AUTOMATIC SHIFTING HUB

This invention relates to hubs for vehicles such as bicycles and has particular reference to a hub containing an automatic shifting mechanism that is responsive to the torque applied by the operator of the vehicle.

BACKGROUND OF THE INVENTION

Many bicycles are equipped with gear shifting mechanisms to match the limited power of the human operator to the terrain and to the desires of the operator for speed. Most commonly, manual systems are used to move the driving chain to larger or smaller sprockets connected to the driving hub of the wheels of the bicycle. Less commonly, gearing has been disposed inside the hub itself to obtain the desired ratio of pedal revolutions to wheel revolutions.

Some of these hub gearings are manually activated and some are speed responsive. While many bicycle operators desire maximum speed to govern the gear ratio of pedal to wheel, others desire to use the output of human energy to control the shifting and thereby accommodate to hills, soft ground and other features by changes in gear ratio. While this automatic torque response shifting is widely desired there have been few hubs available on the market.

BRIEF SUMMARY OF THE INVENTION

I have discovered a simplified mechanism that responds to the applied torque. If an operator wishes to apply high torque by pressing harder on the bicycle pedals, he will normally wish to use his lowest gear (lowest ratio between wheel rpm and pedal rpm). This can be one-to-one or even one-half of a wheel revolution to a full pedal revolution. I presently prefer a one-to-one lowest ratio and an increase of 1.333 at each stage so that a five speed shift will result in a 1 to 3.16 ratio. Any other reasonable ratios can be used.

When a bicyclist starts operation of the bicycle, he will apply a considerable torque to accelerate the vehicle. For this purpose he will want the lowest gear ratio, for example, one-to-one. Once the acceleration is accomplished the operator will normally reduce the torque applied to the drive sprocket pedals and it is then that the operator will wish to increase the gear ratios. The hub of this invention responds to a progressive reduction in pedal pressure by the operator, which results in a progressive reduction in torque, by an increase in gear ratios. This type of response meets the desires of a large number of bicycle operators.

I obtain this result by the use of 4 compression springs between stages in the shifting mechanism, and more particularly by compression springs of progressively different strengths. The compression springs actuate clutches that engage the gear shifting mechanisms which preferably employ gearing. In this fashion I create a number of different spring strengths that match a normal range of torque generated by the ordinary bicycle operators. Different compression springs ranges can be substituted for bicycle operators of superior strength and those of less than normal strength, such as children.

BRIEF DESCRIPTION OF THE DRAWING

In the drawings forming an integral part of this specification,

The group comprising FIGS. 1A–1E is an exploded three dimensional view of the presently preferred embodiment of the new bicycle hub and it has various parts;

FIG. 1A shows the exterior hub with the four wrapping springs for four of the stages and gear teeth for the fifth stage;

FIG. 1B shows the stationary sun gear shaft about which planetary gears rotate.;

FIG. 1C shows the hub drive sprocket to which a bicycle chain is engaged for driving it in rotation, together with bearings for the hub shell of FIG. 1A.;

FIG. 1D shows one of four identical assemblies that includes a wrapped spring clutch and planetary gears.

FIG. 1E shows one of three identical assemblies including a rotable cylinder driven by planetary gears and selectively engaged by the wrapped springs of FIG. 1A.;

FIG. 2 shows the parts of FIG. 1 in their assembled form and is an elevation view partly in section;

FIG. 3 is an elevation view of the left end of the assembly of FIG. 2;

GENERAL DESCRIPTION

Figure 5:
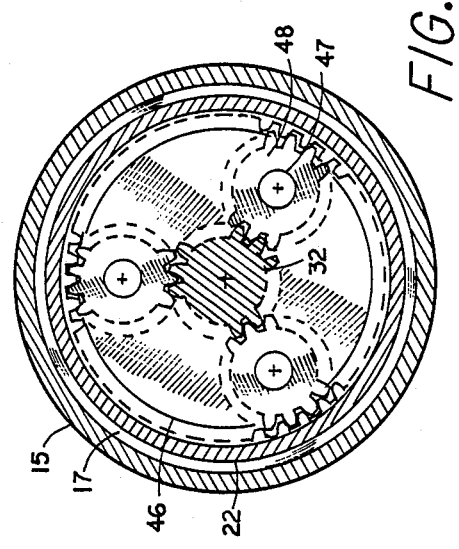
FIG. 5 is a sectional view along the line V—V of FIG. 2.

Referring to FIGS. 1, FIG. 1A shows the exterior hub system 10 and to the left, FIG. 1B shows the sun gear stationary shaft assembly 11. FIG. 1C shows the sprocket drive system 12. FIG. 1D shows the planetary gear system 13 of which there are four in the completed hub and FIG. 1E shows the planetary ring gear system 14 of which there are only three in as much as the sprocket drive system 12 acts similarly to the ring gear system 14 to give a total of four such functions.

Referring now to FIG. 1A, the outer hub system includes a hub shell 15 carrying four outer helical hub wrapped springs 16, 17, 18, and 19. When wrapped spring 16 is energized it grasps a cylinder surface 21 of FIG. 1C and the bicycle operator rotates this cylinder surface 21 in a counter clockwise direction by driving a sprocket 20 in the direction of arrow 9. This engagement of spring 16 and cylinder surface 21 gives the lowest drive (one-to-one gear ratio) of the entire hub inasmuch as the hub 15 is connected to the wrapped spring 16 by a tang 30.

If now the operator applies less torque to the sprocket 20, the second helical hub wrapped spring 17 will grasp a cylinder 22 of FIG. 1E having internal teeth 23 which are engaged by planetary gears 48 of FIG. 1D. These planetary gears 48 rotate the cylinder 22 faster than the sprocket 20 and because of the wrapped spring 17, will drive the hub 15 faster than the sprocket 20. This causes the first hub wrapped spring 16 of FIG. 1A to release its grip on cylinder 21 (FIG. 1C) and thereafter the first wrapped spring 16 slides on the surface 21. While any reasonable gear ratio can be used, I presently prefer 1 to 1.33.

If lesser torque is applied by the operator to sprocket 20 of FIG. 1C then the cylinder 22 of the next set of systems of FIG. 1E will be rotating faster than the cylinder 22 of the first system 14. This will cause the third helical hub wrapped spring 18 to engage that cylinder 22 to drive the hub 15 even faster. This causes the second wrapped spring 17 to release its grip on its cylinder 22 and therefore to slide on the surface of that cylinder 22.

If a still lesser torque is applied by the operator then the fourth hub wrapped spring 19 of hub 15 will be engaged in a similar manner and the hub 15 will rotate even faster, releasing wrapped spring 18 and wrapped springs 18 and 17 will slide on their respective cylinders 22 of FIG. 1E, and the first wrapped spring 16 will continue to slide on its cylinder 21 of FIG. 1C.

If a still lesser amount of torque is applied by the operator to sprocket 20 then the final or fourth set of planetary gears which are always engaged with internal teeth 24 in the hub 15 (FIG. 1A) will drive hub 15, releasing hub wrapped springs 19, 18, 17 and 16, resulting in the highest gear ratio. If all of these stages increase by the ratio 1 to 1.333 the gear ratios are cumulated and the gear ratios are as follows:

1 to 1 16 engages 21,
1 to 1.33 17 engages first 22,
1 to 1.77 18 engages second 22,
1 to 2.37 19 engages third 22,
1 to 3.16 fourth planetary gears 48 drive the hub 15

DESCRIPTION OF THE SYSTEMS OF FIGS. 1C AND 1D

Referring to FIG. 1C, the sprocket 20 is keyed to the cylinder 21 which has a race in which are disposed ball bearings 26 which engage a race 27 in hub 15 (FIG. 1A). The hub 15 is therefore free to rotate on the cylinder 21. The sprocket 20 and cylinder 21 are free to rotate with respect to the bicycle frame because of an outer bearing plate 28 having a race on which are disposed ball bearings 29 engaging a race on cylinder 21. The bearing plate is internally threaded and is screwed onto the threaded right end 31 (FIG. 1B) of stationary sun gear shaft 32 which is held stationary on the bicycle frame by a torque arm 33 which is attached to bearing race 52 which engages ball bearings 53 to support and permit rotation of hub 15.

Referring to FIG. 1C, disposed within the cylinder 21 and keyed thereto at 34 is a torque drive plate 35 having a plurality of notches 36 which match a similar group of notches 37 on a torque receiving plate 38. Inserted in the matching notches 36 and 37 are compression springs 39 and I presently prefer compression springs of the type known as Belleville spring washers which are clustered groups of conical washers made of spring steel or the like. Inserted in the interior of the two torque plates 35 and 38 is a filler ring 41 to retain the compression springs 39 in the slots 36–37, best seen in the assembly in FIG. 2. This filler ring 41 is free to rotate. The torque receiving plate 38 rotates just a few degrees with respect to the torque drive plate 35 but this slight rotation is enough to activate or inactivate an inner helical wrapped spring 42 having an inwardly projecting tang 43 that fits in a notch 44 on the outer periphery of the torque receiving plate 38. The amount of rotation of the torque receiving plate 38 relative to the torque drive plate 35 is limited by the available amount of the compression of the compression springs 39.

Referring still to FIG 1D, disposed within the inner wrapped spring 42, is the torque receiving plate 38 and a round planetary hub plate 46 having three gear shafts 47 pressed in holes in the plate and planetary gears 48 are mounted on the gear shafts 47 for rotation. The inner wrapped spring 42, with the plates 38 and 46 disposed inside of it, is in turn inserted inside the cylinder 21, along with compression springs 39 and filler ring 41, and an outer tang 49 on the wrapped spring 42 is lodged in a notch 51 in the cylinder 21. The tang 49 of the second, third, and fourth, wrapped springs 42 fit in notches 51 of the cylinders 22.

The tangs 49 fit in notches 51 with enough clearance to allow movement of the tang 49 in the notches 51. This allows expansion of the compression springs 39. Slight additional clearance is required to permit inner wrapped spring 42 to unwrap and release planetary hub plate 46 when in a coasting (non-driving) mode. Although hub wrapped springs 16–19 will slip on cylinders 21 and 22 when coasting, the inner wrapped spring 42 must disengage planetary hub plate 46 at the final stage where planetary gear set 46–48 is constantly engaged with internal teeth 24 in the hub shell 15. The amount of movement of tangs 49 in notches 51 is equal to the amount of compression of the springs 39 plus a small additional clearance of a few hundredths of an inch.

When the torque decreases in the sprocket 20, the compression springs 39 expand, rotating the torque receiving plate 38 in a counter clockwise direction. This in turn acts through the spring tang 43 to move spring tang 49 away from striking the right edge of notch 51, thereby allowing the spring 42 to tighten on the planetary hub 46 causing rotation of the planetary hub 46.

The planetary gears 48 engage the stationary sun gear shaft 32 of FIG. 1B and engage also the internal teeth 23 on the cylinder 22 of FIG. 1E. This causes rotation of the cylinder 22. When not activated, the outer wrapped springs 7, 18, and 19 loosely ride on cylinder surfaces 22 and wrapped spring 16 rides on the outer surface of cylinder 21. One end of each outer wrapped spring 16, 17, 18, and 19 is connected to the hub 15 by outer tangs 30. The other ends of these outer wrap springs are free and ride on their cylinder surfaces 22 and 21.

FUNCTION OF COMPRESSION SPRINGS 39

Referring now to FIGS. 1C and 1D, the angular position of the notches 51 (FIG. 1C) and 44 (FIG. 1D), with reference to a central axis 50 are carefully selected with respect to the angular location of tangs 43 and 49 on the inner wrapped spring 42. When the compression springs 39 are in their expanded condition the notches 44 and 51 permit the wrapped spring 42 to grasp the planetary plate 46 and thereby rotate it. This causes the gears 48 to drive through the systems 13 and 14 to the final stage where the planetary gears 48 engage the internal teeth 24 on the hub shell 15 (FIG. 1A). Upon the application of high torque, this attempt to drive the hub 15 with the planetary gears and the drag through the systems 13 and 14 loads up the compression springs 39 so that they compress allowing the torque receiving plate 38 to rotate a few degrees. This rotation acts through tang 43 to rotate the spring 42 clockwise as viewed in FIG. 1. This rotation of spring 42 permits the tang 49 to strike the right edge of notch 51 and thereby unwrap the spring 42 and release it from the planetary hub or plate 46. When the compression springs 39 are compressed, the wrapped springs 42 that are released from the planetary gear sets are idle. The last planetary gear set 46–48 continues to rotate at all times because the planetary gears 48 of that system are constantly engaged with the shell gears 24 (FIG. 1A). The compression springs 39 expand when applied torque equals the compression strength of the various groups of springs 39.

The correlation between the gear ratios and the quantity of compression springs 39 is as follows:
ratio 1 to 1 no compression springs utilized
ratio 1 to 1.33 eight compression springs
ratio 1 to 1.77 six compression springs
ratio 1 to 2.37 four compression springs
ratio 1 to 3.16 three compression springs

STARTING OPERATION

Referring to FIG. 1, when starting, the operator of a vehicle employing my hub will ordinarily apply maximum torque to the drive sprocket 20 (FIG. 1C) to rotate it and cylinder 21 in the direction of arrow 9. This cylinder rotation acts on the outer wrapped spring 16 of the hub shell 15 (FIG. 1A) to wrap that spring on to cylinder 21 causing rotation of the hub shell 15 at the same r.p.m. as the sprocket 20.

As previously explained, at the time of applying maximum torque to sprocket 20, the compression springs 39 will be compressed and this relaxes the internal wrapped springs 42 so that the planetary gear plates 46 and the planetary gears 48 will not be driving the hub 15. At maximum torque there is a condition of constant slipping of the planetary plates 46 inside of springs 42. Therefore the cylinders 22 will rotate only as fast as the rotation of hub shell 15 will permit.

UP SHIFTING OPERATION

When the operator has sufficiently accelerated his vehicle by application of high torque he will thereafter reduce the torque. As stated previously, each pair of torque drive plates 35 and torque receiving plates 38 have different numbers of compression springs 39, the pair inside cylinder 21 (FIG. 1C) having eight in number as shown on the drawing, the next pair having six springs 39, the next pair four and the last pair having three. Since all compression springs 39 are of the same strength, those in the torque plate pairs 35–38 with the highest number of springs will have the greatest strength and will expand the first when torque is gradually reduced. This expansion of the eight springs 39 shown In FIG. 1D will cause a slight counter clockwise rotation of the torque receiving plate 38 and this acts on the spring 42 a few degrees in a counter clockwise direction until its tang 49 release from the right edge of the notch 51 in cylinder 21 as viewed in FIG. 1C. This causes the spring 42 to wrap on the first planetary plate 46 which causes its planetary gears to rotate against the stationary sun gear shaft 32 (FIG. 1B) and cylinder teeth 23 to drive in rotation the first cylinder 22. This rotation will be faster than the sprocket 20 rotation because of the gear ratio of 1 to 1.33. The rotation of this first cylinder 22 will cause its associated outer wrapped spring 17 to wrap on this cylinder 22 rotating the hub 15 at a faster r.p.m. This increase of r.p.m. of hub 15 automatically releases the first outer wrapped spring 16 by unwrapping it. The cylinder 22 will continue to be driven.

As mentioned previously, the other cylinders 21 will not be driving at the time of maximum torque nor at a reduction in torque that engages the first cylinder 21. If now the operator further reduces his torque on sprocket 20, the next set of six compression springs 39 will expand, rotating its springs 42 a few degrees until its tang 49 releases from the right edged of notch 51, whereupon it wraps on its planetary plate 46, which in turn rotates the next cylinder 22 but at a higher gear ratio of 1 to 1.33. This causes the next exterior wrapped spring 18 (FIG. 1A) to wrap on that cylinder 21 causing it to rotate the hub shell 15 at the ratio of 1 to 1.77. This being a greater r.p.m. than that of wrapped spring 17, the spring 17 will automatically unwrap.

Upon further reduction in torque by the operator, the next weaker set of four compression springs 39 will expand, rotating its spring 42 causing the next cylinder 22 to rotate and in turn rotating the hub through outer wrapped spring 19 at the gear ratio of 1 to 2.37 and releasing outer spring 18.

Upon a further reduction in torque the weakest group of springs 39, (three in number) will expand causing rotation of the last planetary plate 46 whose planetary gears 48 engage the internal teeth of the hub 15, FIG. 1A. This ratio is 1 to 3.16.

DOWN SHIFTING OPERATION

If minimum torque is being applied to the sprocket 20 the last planetary gear set 46–48 is driving the hub 15 through the internal hub teeth 24 (FIG. 1A). This drive is from the sprocket 20 through the co-axially aligned four systems of FIG. 1D and the three systems of FIG. 1E. The compression springs 39 interconnecting these systems will be in the expanded condition. If now the operator applies more torque, the hub 15 resists and the weakest set of compression springs 39 will first compress. This will be the three springs 39 disposed in the drive to the last planetary gear 46–48 in engagement with the hub teeth 24. When these three springs 39 compress, they allow contra rotation of the torque receiving plate 38 which acts through the tang 43 to rotate the spring 42 in a clockwise direction which causes its outer tang 49 to engage the right end of its slot 51 in cylinder 22. This loosens the helical inner wrapped spring 42 on its planetary plate 46 and the planetary gears 48 engaging teeth 24 can no longer rotate the hub because they are disconnected from the power train. The last cylinder 22 of the power train will now rotate at a faster r.p.m. because of the application of torque and when this r.p.m. matches the r.p.m. of the hub 15, the left hand outer wrapped spring 19 will grasp the respective cylinder 22. The hub 15 will now be driven through wrapped spring 19 instead of through gear teeth 24.

If still more torque is applied, the four compression springs 39 disposed between the cylinders 22 of wrap springs 19 and 18 are now the weakest links in the drive train and they will compress, disconnecting the power from the last or most left hand cylinder 22. The application of torque causes the next cylinder in line to speed up its rotation and when it matches the hub r.p.m. then wrapped spring 18 will grasp its cylinder 21 and the shift to a lower gear is completed.

In this fashion the application of more torque will cause a down shifting to the cylinder 22 of wrap spring 17 and further torque will down shift to wrap spring 16 which will grip cylinder 21 (FIG. 1C) at which point the lowest gear ratio of 1 to 1 is in effect.

In this fashion the application of more torque will cause a down shifting to the cylinder 22 of wrapped spring 17 and further torque will down shift to wrapped spring 16 which will grip cylinder 21 (FIG. 1C) at which point lowest gear ratio of 1 to 1 is in.

Figure 6:
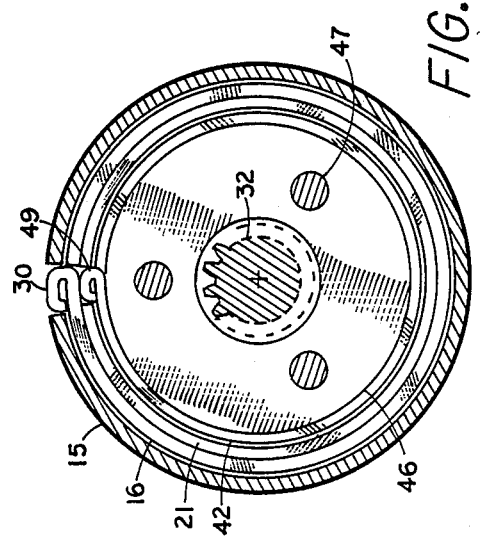
FIG. 6 is a sectional view taken along the line VI—VI of FIG. 2 showing an outer wrapped spring and an inner clutch wrapped spring.
Figure 4:
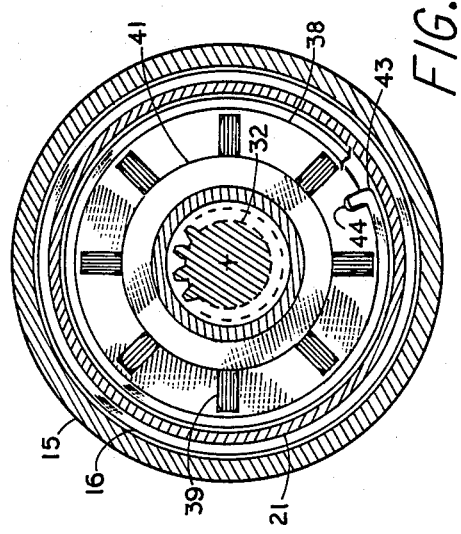
FIG. 4 is a sectional view taken along the line IV—IV of FIG. 2 showing the planetary gears.

Referring to FIGS. 2–6 the structure of FIG. 1 is shown in its assembled condition. There it will be noted that the first assembly of FIG. 1D fits inside the cylinder 21 except that the planetary gears 48 project outside the cylinder 21 to engage teeth 23 in the first cylinder 22 of FIG. 1E. The assemblies of FIGS. 1C, 1D and 1E form a power train to rotate the hub shell 15 by the last (left) set of planetary gears 48 contacting the internal gear teeth 24 of hub 15 (FIG. 1A).

Referring to FIG. 1E, a retainer plate 54 is disposed between the planet gears 48 and the torque drive plate 35. Referring to FIG. 2, disposed between springs 17, 18 and 19 are cylindrical spacer rings 56.

I have described the presently preferred embodiment of my invention as required by the patent statutes. It will be obvious to those skilled in the art that various changes and modification can be made. All such variations, modifications and changes made within the true spirit of the invention are included within the scope of the following claims.

I claim:

1. A torque responsive automatic shifting bicycle hub comprising:
   a. an outer hub shell to which wheel structure may be attached;
   b. a plurality of co-axial rotatable cylinders disposed in lineal array within the hub shell;
   c. a plurality of outer helical wrapped springs having one end connected to the hub shell and disposed inside the hub and disposed over the cylinders for a sliding engagement with the cylinders when the cylinders are rotating slower than the hub and gripping the cylinders when the cylinders attempt to rotate faster than the hub;
   d. a torque applying sprocket secured to one of said cylinders at one end of the lineal array;
   e. a torque drive plate secured to each cylinder and having compression spring recesses;
   f. a rotatable torque receiving plate for each cylinder and having recesses in registry with the recesses of the torque drive plate;
   g. compression springs disposed in the registered recesses and engaged by both plates and subject to compression and expansion upon the application of torque to the sprocket and the reduction of torque;
   h. a round plate for each cylinder;
   i. gearing inter-connecting each round plate and the adjoining cylinder;
   j. an inner helical wrapped spring disposed about each round plate and having one end connected to the torque receiving plate and the other end connected to the cylinder with a sliding movement connection,
   whereby applying torque to the sprocket will compress the compression springs which act through the torque receiving plate to uncouple the inner helical springs from their round plates and whereby reducing torque allows the springs to expand and act through the torque receiving plates to wrap the inner helical springs.

2. An automatic shifting hub as set forth in claim 1 wherein the gearing rotates the cylinders, at progressively greater speeds from one end of the axis to the other.

3. An automatic shifting hub as set forth in claim 1 wherein the compression springs are Belleville washers.

4. An automatic shifting hub as set forth in claim 1 wherein the gearing includes an axial stationary splined shaft, internal teeth on the cylinders and at least one planetary gear on the round plate engaging the splined shaft and the internal teeth.

5. An automatic gear shifting hub comprising:
   a. a rotatable hub shell to which wheel structure may be attached;
   b. a plurality of co-axial cylinders in lineal array disposed inside the shell;
   c. a plurality of outer helical wrapped springs having one end connected to the hub shell and disposed inside the hub and disposed over the cylinders for a sliding engagement with the cylinders when the cylinders are rotating slower than the hub and gripping the cylinders when the cylinders attempt to rotate faster than the hub;
   d. means for applying torque to one cylinder at one end of the lineal array to drive it in rotation;
   e. a power train from said one cylinder to drive the other cylinders in rotation at progressively greater r.p.m. than the one cylinder, said train including spring clutches;
   f. and torque responsive springs connected to each clutch to disengage the clutch when the torque is high and engage the clutches when the torque is low.

6. An automatic gear shifting hub as set forth in claim 5 wherein the torque responsive springs are progressively weaker from the one cylinder to the other cylinders.

7. An automatic gear-shifting hub comprising;
   a. a rotatable hub shell to which wheel structure may be attached;
   b. a plurality of co-axial cylinders disposed inside the shell;
   c. a plurality of outer helical wrapped springs having one end connected to the hub shell and disposed inside the hub and disposed over the cylinders for a sliding engagement with the cylinders when the cylinders are rotating slower than the hub and gripping the cylinders when the cylinders attempt to rotate faster than the hub;
   d. means for applying torque to at least one cylinder to drive it in rotation;
   e. means for rotating the other cylinders at progressively greater r.p.m. than the one cylinder;
   f. and torque matching means for selectively rotating one of said other cylinders faster than the hub, whereby the wrapped springs grip the cylinders which are attempting to rotate faster than the hub and release the cylinders when the cylinders are rotating slower than the hub.

8. A gear-shifting hub as set forth in claim 7, wherein said means for rotating the cylinders at progressively greater r.p.m. includes gearing interconnecting the cylinders.

9. An automatic gear-shifting hub as set forth in claim 7, wherein springs interconnect the cylinders and the springs are progressively weaker from one end of the central axis of the cylinder to the other end, whereby an increase of torque at one end of the cylinder axis will progressively result in a decrease of r.p.m. of the cylinder to a cylinder at the other end of the cylinder axis where the spring strength matches the torque applied.

10. An automatic gear shifting hub as set forth in claim 7 wherein the torque matching means for selectively rotating a cylinder includes inner wrapper springs that interconnect the cylinders.

11. An automatic gear-shifting hub as set forth in claim 7 wherein the torque matching means includes torque deflectable springs and a clutch connected between cylinders, and the clutch is engaged when there is lesser deflection of the spring and the clutch is disengaged when there is greater deflection of the torque deflectable spring.

12. An automatic gear-shifting hub as set forth in claim 7 wherein element e and element f are combined and the torque matching means is disposed in the means for rotating the other cylinders.

13. An automatic gear-shifting hub as set forth in claim 7 wherein gearing interconnects the hub and a cylinder of said other cylinders which may be rotated at an r.p.m. which is greater than that of any of said other cylinders.

* * * * *